(12) United States Patent
Horde et al.

(10) Patent No.: US 10,784,523 B2
(45) Date of Patent: Sep. 22, 2020

(54) FUEL CELL STACK PRESENTING REINFORCED STRUCTURE

(71) Applicant: Safran Power Units, Toulouse (FR)

(72) Inventors: Théophile Horde, Suresnes (FR); Fabien Boudjemaa, Garches (FR)

(73) Assignee: SAFRAN POWER UNITS, Toulouse (FR)

(*) Notice: Subject to any disclaimer, the term of this patent is extended or adjusted under 35 U.S.C. 154(b) by 0 days.

(21) Appl. No.: 15/556,896

(22) PCT Filed: Mar. 8, 2016

(86) PCT No.: PCT/FR2016/050530
§ 371 (c)(1),
(2) Date: Sep. 8, 2017

(87) PCT Pub. No.: WO2016/142619
PCT Pub. Date: Sep. 15, 2016

(65) Prior Publication Data
US 2018/0048000 A1   Feb. 15, 2018

(30) Foreign Application Priority Data
Mar. 9, 2015 (FR) .................................... 15 51950

(51) Int. Cl.
*H01M 8/0273* (2016.01)
*H01M 8/248* (2016.01)
(Continued)

(52) U.S. Cl.
CPC ....... *H01M 8/0273* (2013.01); *H01M 8/0252* (2013.01); *H01M 8/0267* (2013.01);
(Continued)

(58) Field of Classification Search
CPC ............. H01M 8/0273; H01M 8/0252; H01M 8/0267; H01M 8/247; H01M 8/248
See application file for complete search history.

(56) References Cited

U.S. PATENT DOCUMENTS

| 4,604,331 A * | 8/1986 | Louis ................. H01M 8/0247 429/511 |
| 2005/0106444 A1 | 5/2005 | Yamauchi et al. |

(Continued)

FOREIGN PATENT DOCUMENTS

| JP | 2006/147255 | 6/2006 |
| WO | WO2006/093061 | 9/2006 |

OTHER PUBLICATIONS

International Search Report and English language translation dated May 19, 2016, in International Application No. PCT/FR2016/050530 (7 pages).

*Primary Examiner* — Osei K Amponsah
(74) *Attorney, Agent, or Firm* — Bookoff McAndrews, PLLC

(57) ABSTRACT

A bipolar plate (20) for making a proton-exchange membrane fuel cell stack, said bipolar plate (20) being made up of metal sheets that are shaped and assembled together in such a manner as to define primary fluid-flow channels (24) and secondary fluid-flow channels (25) that are arranged in alternation, said primary channels (24) being formed between said assembled-together sheets; the bipolar plate (20) being characterized in that it includes mechanical reinforcement (35) made out of metal material arranged in a reinforcing duct (30) of the bipolar plate (20), said metal reinforcement (35) being configured in such a manner as to oppose a compression force applied to the bipolar plate (20), said bipolar plate (20) further including a source of elec-
(Continued)

tricity adapted to feed electric current to the mechanical reinforcement (35) and thereby give off heat by the Joule effect.

5 Claims, 3 Drawing Sheets

(51) Int. Cl.
    *H01M 8/247*     (2016.01)
    *H01M 8/0252*     (2016.01)
    *H01M 8/0267*     (2016.01)
    *H01M 8/1018*     (2016.01)

(52) U.S. Cl.
    CPC ........... *H01M 8/247* (2013.01); *H01M 8/248* (2013.01); *H01M 2008/1095* (2013.01); *Y02P 70/56* (2015.11)

(56) References Cited

U.S. PATENT DOCUMENTS

| | | |
|---|---|---|
| 2007/0264557 A1 | 11/2007 | Kobayashi et al. |
| 2008/0090129 A1* | 4/2008 | Kunz .................. H01M 8/0234 429/457 |
| 2010/0068588 A1 | 3/2010 | Nogi et al. |

\* cited by examiner

FUEL CELL STACK PRESENTING REINFORCED STRUCTURE

CROSS-REFERENCE TO RELATED APPLICATIONS

This application is the U.S. national phase entry under 35 U.S.C. § 371 of International Application No. PCT/FR2016/050530, filed on Mar. 8, 2016, which claims priority to French Patent Application No. 1551950, filed on Mar. 9, 2015, the entireties of which are herein incorporated by reference.

GENERAL TECHNICAL FIELD

The present invention relates to the field of fuel cells, and it relates more particularly to fuel cells for applications in the field of aviation.

STATE OF THE PRIOR ART

Fuel cells operate on a principle associated with electrochemical reactions at electrodes that are separated by an electrolyte. For $H_2$ and $O_2$ fuel cells, the electrochemical reactions lead to water, electricity, and heat being generated.

Proton-exchange membrane fuel cells are made up of bipolar plates, amongst other things. Such bipolar plates are typically formed by assembling fine sheets that are shaped and assembled together in pairs so as to form cooling channels in which a heat transfer fluid flows, reagent channels for passing flows of reagents, and support surfaces for positioning and compressing sealing elements that provide sealing between the various circuits for reagents and for heat transfer fluid.

Thus, FIG. 1 shows a conventional structure for a stack of a proton-exchange membrane fuel cell made up of an assembly of bipolar plates 11, having proton-exchange membranes 12 and sealing elements 13 arranged between them.

FIG. 2 is a section view of such a stack. There can thus be seen bipolar plates 11 formed by assembling together shaped thin metal sheets so as to form primary ducts 14 commonly used for passing a flow of heat transfer fluid that serves to cool the stack.

The stack of bipolar plates 11 also defines secondary ducts 15 between two adjacent bipolar plates 11, these secondary ducts being separated by the membrane electrode assembly (MEA) 12 that is itself made up of two electrodes 121 and a proton-exchange membrane 122 so as to allow two reagents of the fuel cell to flow in the two secondary duct portions as defined in this way.

The sheets constituting the bipolar plates 11 also include support zones 16 enabling a compression force to be applied on the sealing elements 13, which sealing elements 13 are consequently compressed between the bipolar plates 11 and the MEA 12.

The primary ducts 14 define assembly surfaces between the bipolar plates and the MEAs 12.

The fine sheet structures constituting the bipolar plates that define the primary ducts 14, the secondary ducts 15, and the support zones 16 may define various geometrical shapes, which may optionally be identical. In FIG. 2, the primary ducts 14, the secondary ducts 15, and the support zones 16 present identical hexagonal shapes.

The sealing element 13 may present various shapes, of rectangular, circular, or other section. The sealing elements 13 perform their sealing function when they are compressed by a compression force, which compression force is itself transmitted by the support zones 16 of the bipolar plates 11.

Consequently, the bipolar plates 11 as made up in this way out of assembled-together sheets can become deformed and can present warping, in particular because of residual stresses due to the methods of fabricating the sheets, or because of the force applied to the support zones 16 supporting the sealing elements 13.

SUMMARY OF THE INVENTION

The present invention thus seeks to remedy those problems at least in part, and it proposes a bipolar plate for making a proton-exchange membrane fuel cell stack, said bipolar plate being made up of metal sheets that are shaped and assembled together in such a manner as to define primary fluid-flow channels and secondary fluid-flow channels that are arranged in alternation, said primary channels being formed between said assembled-together sheets;

the bipolar plate being characterized in that it includes mechanical reinforcement made out of metal material arranged in a reinforcing duct of the bipolar plate, said metal reinforcement being configured in such a manner as to oppose a compression force applied to the bipolar plate, said bipolar plate further including a source of electricity adapted to feed electric current to the mechanical reinforcement and thereby give off heat by the Joule effect.

The invention thus serves both to reinforce the strength of the fuel cell against a compression force, and also to perform a function of raising the temperature of the fuel cell, in particular while it is being put into operation.

There follow various optional characteristics of the bipolar plate that may be taken independently or in combination:
- the mechanical reinforcement forms a frame surrounding the primary and secondary channels of the bipolar plate, in full or in part;
- said mechanical reinforcement extends through the entire thickness of the bipolar plate;
- said mechanical reinforcement is made out of metal material; the bipolar plate can then further include a source of electricity adapted to feed electric current to the mechanical reinforcement and thereby give off heat by the Joule effect; and
- said mechanical reinforcement is a beam presenting an I section or a hollow rectangular section.

The invention also provides a fuel cell comprising a stack in a normal direction of a plurality of individual cells arranged between two terminal plates, each individual cell comprising bipolar plates as defined above and a membrane electrode assembly, the mechanical reinforcement of said bipolar plates opposing a compression force applied to the stack in the normal direction.

By way of example, said bipolar plates forming the stack are identical.

SUMMARY OF THE FIGURES

Other characteristics, objects, and advantages of the invention appear from the following description, which is purely illustrative and nonlimiting, and which should be read with reference to the accompanying drawings, in which.

In all of the figures, elements that are in common are identified by identical numerical references.

DETAILED DESCRIPTION

Figure 1:
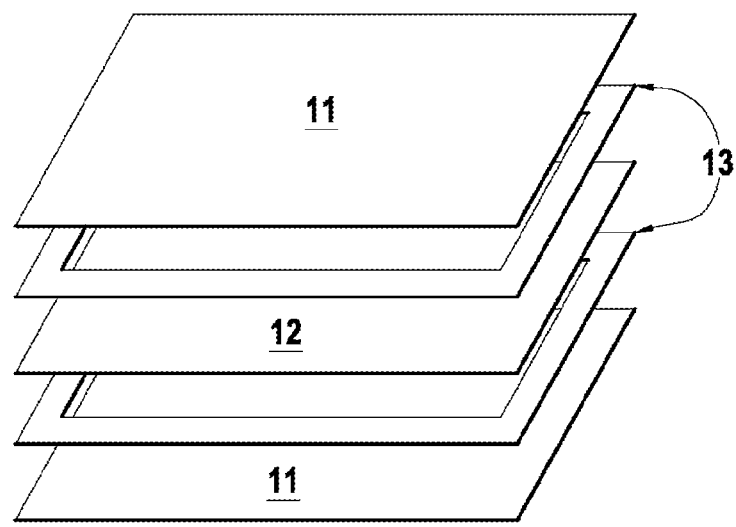
FIG. 1, described above, shows the general structure of a proton-exchange membrane fuel cell.
Figure 2:
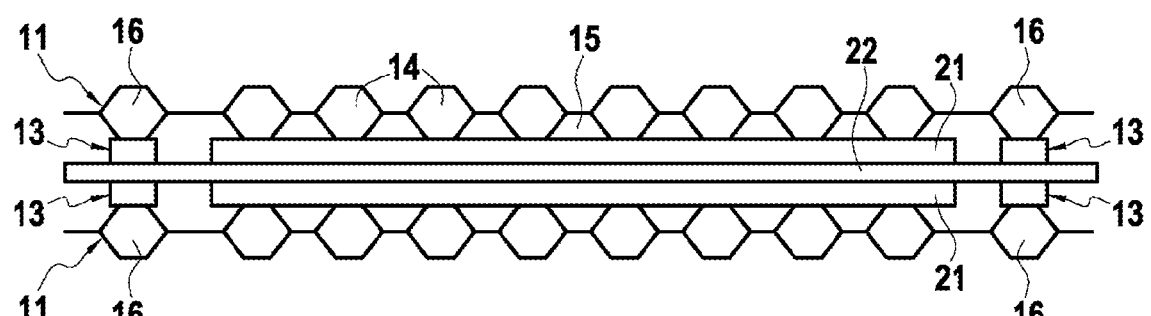
FIG. 2, described above, is a section view of a stack of such a fuel cell.
Figure 3:
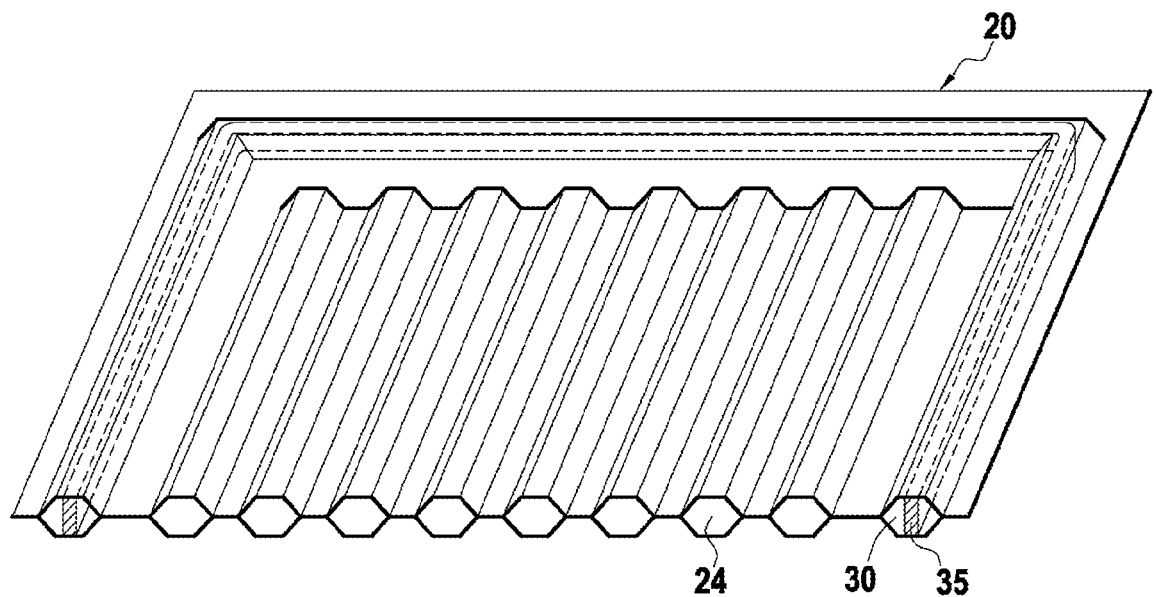
FIG. 3 is a diagram showing an exemplary bipolar plate for a fuel cell in an aspect of the invention.
Figure 4:
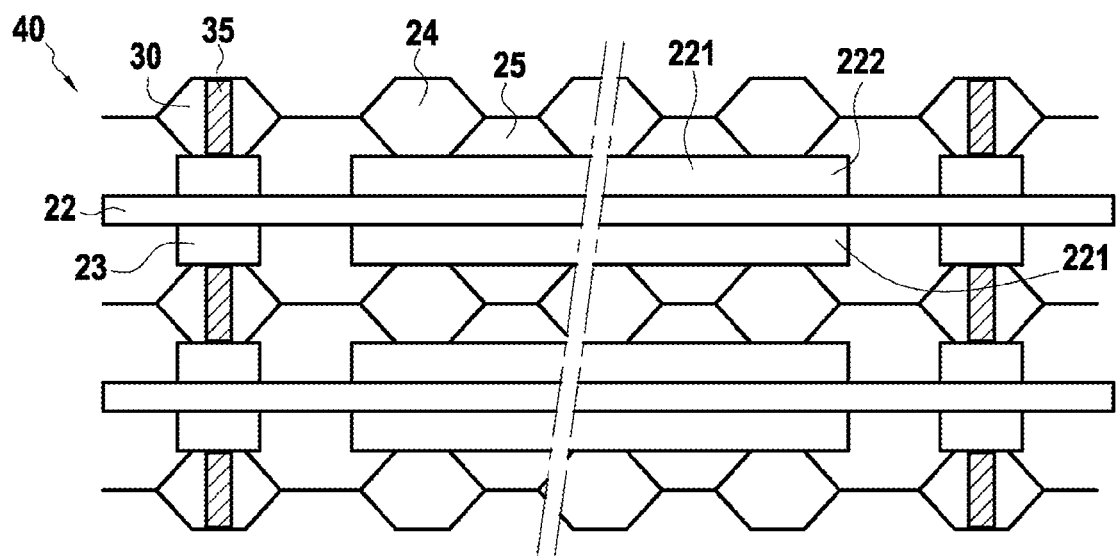
FIG. 4 shows a stack of such bipolar plates.

FIG. 3 is a diagram showing an exemplary bipolar plate for a fuel cell in an aspect of the invention, and FIG. 4 shows a stack of such bipolar plates.

These figures show a bipolar plate 20 formed by assembling together shaped metal sheets, thereby defining a plurality of primary ducts 24 within the bipolar plate 20, which ducts are defined by the two sheets forming the bipolar plate 20.

In the embodiment shown, the primary ducts 24 are of hexagonal section, and they are separated by strips where the sheets forming the bipolar plate 20 are assembled together, e.g. by welding. The primary ducts 24 thus define a top face and a bottom face of the bipolar plate 20, as defined by the plane faces of the primary ducts 24 defining the maximum thickness of the bipolar plate 20.

The bipolar plates 20 are superposed so as to form a fuel cell stack. Membrane electrode assemblies 22, referred to by the acronym MEA 22, comprising two electrodes 221 surrounding a proton-exchange membrane 222 are interposed between two successive bipolar plates 20 so as to define the exchange interfaces between the reagents flowing in the secondary ducts 25.

The bipolar plates 20 are stacked in a direction normal to the midplanes of the bipolar plates 20, the midplanes of the bipolar plates 20 being defined by the touching plane surfaces of the sheets forming the bipolar plates 20.

As shown in FIG. 4, superposing the bipolar plates 20 and the MEAs 22 forms the secondary ducts 25 for passing the flows of reagents between the bipolar plates and the MEAs, e.g. flows of oxygen and hydrogen, while the primary ducts 24 serve to pass a flow of heat transfer fluid serving in particular to cool the stack.

In the embodiment shown, the secondary ducts 25 are trapezoidal in section, and the primary and secondary ducts 24 and 25 are in a staggered arrangement.

The MEAs 22 separate the secondary ducts 25 of two adjacent bipolar plates 2 to pass the flow of two reagents on either side of the MEA 22.

Sealing elements 23 are arranged at the interface between the bipolar plates 20 and the adjacent MEAs 22, between the support zones 30, so as to provide insulation between the secondary ducts 25 and the outside medium. A sealing element 23 is thus interposed between each interface between an MEA 22 and a bipolar plate 20.

In addition to the primary and secondary ducts 24 and 25, the bipolar plates 20 include reinforcing ducts 30 formed between the assembled-together sheets constituting each of the bipolar plates 20, and mechanical reinforcement 35 is placed in the reinforcing ducts.

By way of example, although not necessarily, the reinforcing ducts 30 are identical in shape to the primary ducts 24, i.e. of hexagonal section in the embodiment shown in figures, and they are thus identical in thickness to the primary ducts 24, where thickness is measured in the direction normal to the midplane of the bipolar plate 20 under consideration.

The mechanical reinforcement 35 is placed in the reinforcing ducts 30 and is configured in such a manner as to oppose a compression force applied on the bipolar plate 20, e.g. when applying a force on the top face and/or the bottom face of the bipolar plate 20.

The mechanical reinforcement 35 thus opposes greater mechanical strength than would be opposed by the bipolar plate 20, thereby opposing deformation of the bipolar plate 20, in particular when a compression force is applied on the bipolar plate 20.

The mechanical reinforcement 35 may be fastened to the bipolar plate 20, e.g. by welding when the mechanical reinforcement 35 and the bipolar plates 20 are made of appropriate materials.

More particularly, the mechanical reinforcement 35 is configured to prevent possible deformation of the bipolar plates 20 when they are assembled together in order to form a stack as shown in FIG. 4.

Specifically, in order to form such a stack, it is necessary to apply a compression force so as to ensure that the MEAs 22 and the sealing elements 23 are assembled in leaktight manner together with the bipolar plates 20.

However, the bipolar plates 20 present limited mechanical properties, particularly since they are made up of fine metal sheets that have been assembled together. The mechanical reinforcement 35 thus enables the bipolar plates 20 to withstand better the forces that are applied during assembly, and also to oppose the residual stresses resulting from the methods used for shaping the sheets that form the bipolar plates 20.

As shown in FIG. 4, and by way of example, the reinforcing ducts 30 and the mechanical reinforcement 35 may be configured so as to be superposed while the bipolar plates 20 are being stacked, such that the compression force is transmitted between the various pieces of mechanical reinforcement 35 without deforming the various primary and secondary ducts 24 and 25 of the stack as made up in this way.

By way of example, the bipolar plates 20 that are stacked are identical, or may present respective pieces of mechanical reinforcement 35 that are identical and thus capable of being superposed.

By way of example, the reinforcing ducts 30 are configured so as to surround the primary and secondary ducts 24 and 25 of the bipolar plates 20, thereby serving to oppose any sagging or warping of the bipolar plate 20 by forming a rigid frame around the primary and secondary ducts 24 and 25.

In the embodiment shown in FIGS. 3 and 4, the mechanical reinforcement 35 is constituted by beams of rectangular section.

Figure 5:
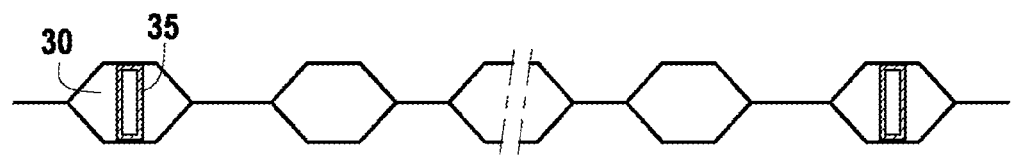
FIGS. 5 and 7 show several particular embodiments of such a bipolar plate.
Figure 6:
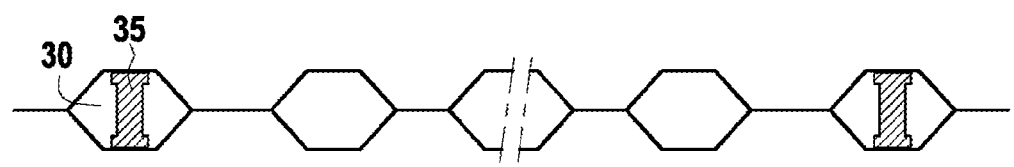
Figure 7:
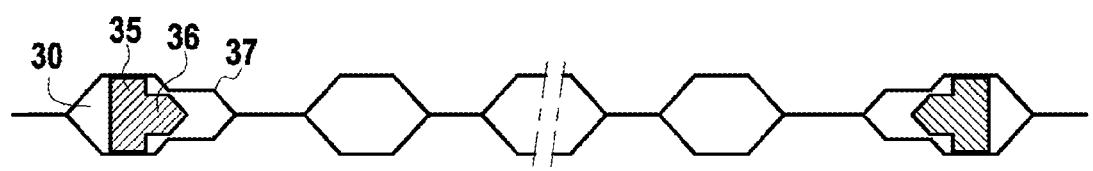

Other embodiments are shown in FIGS. 5 to 7.

Thus, FIG. 5 shows mechanical reinforcement 35 of hollow rectangular section, which is advantageous because of the saving in weight compared with reinforcement as shown in FIGS. 3 and 4.

FIG. 6 shows another embodiment of mechanical reinforcement 35 presenting an I section, thereby improving its compression strength while minimizing its weight.

FIG. 7 shows another embodiment of mechanical reinforcement 35 including an indexing lug 36 adapted to engage in a housing 37 of complementary shape formed in the reinforcing duct 30 so as to center and determine the orientation of the mechanical reinforcement 35 in the reinforcing duct 30. In the example shown in FIG. 7, the mechanical reinforcement 35 has a solid section. It is also possible to make the mechanical reinforcement 35 with a hollow section, in order to minimize its weight.

Conversely, in an embodiment that is not shown, the mechanical reinforcement 35 may present a notch or a housing that receives a lug of the bipolar plate 20, likewise performing a function of centering the mechanical reinforcement 35 in the reinforcing duct 30 and of holding it in position.

The mechanical reinforcement 35 may be made out of various materials, preferably presenting thermal expansion properties close to those of the material forming the bipolar plates 20, and also compatible with the material forming the bipolar plates 20 in the event that the mechanical reinforcement 30 is welded to the bipolar plates 20.

Among the materials that can be used, mention may be made in non-exhaustive and non-limiting manner of the following materials:
- Inconel, e.g. Inconel 625; as is commonly used for making bipolar plates;
- aluminum, which is advantageous in terms of weight;
- stainless steel, e.g. of grades 316 L or 304 L;
- polyether ether ketone (PEEK), a thermoplastic polymer material.

In addition to the function of increasing the mechanical strength of the bipolar plates 20, the mechanical reinforcement 35 can also perform an additional function of preheating the bipolar plates when starting the fuel cell.

Specifically, when the mechanical reinforcement 35 is made out of electrically conductive material, e.g. when using metal mechanical reinforcement 35, the reinforcement may be connected to a source of electricity that is adapted while starting the fuel cell to cause the temperature of the bipolar plate 20 to rise by means of the Joule effect by causing electric current to flow in the mechanical reinforcement 35.

By way of example, the various pieces of mechanical reinforcement 35 in a fuel cell stack may thus be connected to a source of electricity configured to be put into operation prior to putting the fuel cell into operation, so that the fuel cell is put into operation while it is at an optimum temperature. The positioning of the mechanical reinforcement 35 within the fuel cell 20 is advantageous compared with using a heating source external to the fuel cell, or compared with heater systems that present considerable inertia, such as those making use of the cooling circuit of the fuel cell.

The proposed structure thus makes it possible to improve the mechanical strength of bipolar plates, and thus to improve the mechanical strength of the stack of a fuel cell, while also ensuring that the bipolar plates are of a shape that serves in particular to oppose the deformation that could result from the fabrication methods used.

Also, the proposed structure may be used for performing preheating of the bipolar plates prior to putting the fuel cell into operation, which is advantageous in particular for high-temperature fuel cells that present optimum operation in high temperature ranges.

The invention claimed is:

1. A proton-exchange membrane fuel cell stack comprising a bipolar plate, said bipolar plate being made up of metal sheets that are shaped and assembled together in such a manner as to define primary fluid-flow channels and secondary fluid-flow channels that are arranged in alternation, said primary fluid-flow channels being formed between said assembled-together sheets;
   wherein the bipolar plate includes mechanical reinforcement made out of a conductive metal material arranged in a reinforcing duct of the bipolar plate, said mechanical reinforcement being configured in such a manner as to oppose a compression force applied to the bipolar plate, said bipolar plate further including a source of electricity connected to the mechanical reinforcement to feed electric current to the mechanical reinforcement and there by give off heat by the Joule effect,
   wherein the reinforcing duct at least partially surrounds both the primary and secondary fluid-flow channels, and
   wherein said mechanical reinforcement extends through an entire thickness of the bipolar plate.

2. A proton-exchange membrane fuel cell stack according to claim 1, wherein said mechanical reinforcement forms a frame surrounding the primary and secondary fluid-flow channels of the bipolar plate, in full or in part.

3. A proton-exchange membrane fuel cell stack according to claim 1, wherein said mechanical reinforcement is a beam presenting an I section or a hollow rectangular section.

4. A fuel cell comprising a stack in a normal direction of a plurality of individual cells arranged between two terminal plates, each individual cell comprising the bipolar plate according to claim 1 and a membrane electrode assembly, the mechanical reinforcement of said bipolar plates opposing a compression force applied to the stack in the normal direction.

5. A fuel cell according to claim 4, wherein said bipolar plates forming the stack are identical.

\* \* \* \* \*